United States Patent
Godet et al.

(10) Patent No.: US 10,906,362 B2
(45) Date of Patent: Feb. 2, 2021

(54) METHOD FOR IDENTIFYING AT LEAST ONE TRANSMITTER FOR MONITORING THE PRESSURE OF A TIRE OF A MOTOR VEHICLE BY ASSOCIATION WITH ONE OF THE WHEELS OF SAID MOTOR VEHICLE

(71) Applicants: Continental Automotive France, Toulouse (FR); Continental Automotive GmbH, Hannover (DE)

(72) Inventors: Sylvain Godet, Saint-Cezert (FR); Stéphane Billy, Grenade (FR)

(73) Assignees: Continental Automotive France; Continental Automotive GmbH

( * ) Notice: Subject to any disclaimer, the term of this patent is extended or adjusted under 35 U.S.C. 154(b) by 0 days.

(21) Appl. No.: 16/490,960

(22) PCT Filed: May 17, 2018

(86) PCT No.: PCT/FR2018/051195
§ 371 (c)(1),
(2) Date: Sep. 4, 2019

(87) PCT Pub. No.: WO2018/215713
PCT Pub. Date: Nov. 29, 2018

(65) Prior Publication Data
US 2020/0016943 A1    Jan. 16, 2020

(30) Foreign Application Priority Data
May 23, 2017    (FR) ...................................... 17 54548

(51) Int. Cl.
*B60C 23/04*    (2006.01)
*B60C 23/06*    (2006.01)
*G01S 11/06*    (2006.01)

(52) U.S. Cl.
CPC ........ *B60C 23/0416* (2013.01); *B60C 23/062* (2013.01); *G01S 11/06* (2013.01)

(58) Field of Classification Search
CPC ... B60C 23/0416; B60C 23/062; G01S 11/06; G01S 11/10
See application file for complete search history.

(56) References Cited

U.S. PATENT DOCUMENTS 7,574,293 B2 * 8/2009 Vredevoogd ....... B60C 23/0416
                                                     340/442
9,132,705 B2    9/2015 Schultes
(Continued)

FOREIGN PATENT DOCUMENTS

DE    102014118119 A1    6/2015
EP        2014489 A2    1/2009
(Continued)

OTHER PUBLICATIONS

English Translation of the Written Opinion for International Application No. PCT/FR2018/051195, dated Sep. 11, 2018, 6 pages.
(Continued)

*Primary Examiner* — Nadeem Odeh
*Assistant Examiner* — Nicholas K Morgan
(74) *Attorney, Agent, or Firm* — RatnerPrestia

(57) ABSTRACT

A method for identifying at least one emitter for monitoring the tire pressure of a motor vehicle by association with one of the wheels of the motor vehicle. The method includes: for each emitter monitoring tire pressure, reconstructing an intermediate-frequency signal from the radiofrequency signal and a reference signal, determining the FFT of the intermediate-frequency signal, determining whether there is a frequency deviation of the intermediate-frequency signal, determining the side of the vehicle on which the emitter monitoring the pressure of a tire is placed, acquiring a signal
(Continued)

from the anti-lock braking system for at least one of the wheels on the side on which it was determined that the emitter for monitoring the pressure of a tire is placed, and determining the position of the emitter for monitoring the pressure of a tire depending on the deviation and on the at least one signal from the anti-lock braking system.

10 Claims, 4 Drawing Sheets

(56) References Cited

U.S. PATENT DOCUMENTS

| | | | | |
|---|---|---|---|---|
| 2005/0179530 A1* | 8/2005 | Stewart | ............... | B60C 23/0416 340/447 |
| 2007/0205883 A1* | 9/2007 | Mori | ................... | B60C 23/0444 340/447 |
| 2008/0055042 A1* | 3/2008 | Okada | .................... | B60R 25/24 340/5.61 |
| 2010/0274607 A1* | 10/2010 | Carresjo | ................. | G01M 1/28 705/7.11 |
| 2011/0313623 A1* | 12/2011 | Greer | ................... | B60C 23/0489 701/49 |
| 2012/0203400 A1* | 8/2012 | Schultes | ............. | B60C 23/0416 701/1 |
| 2015/0165834 A1 | 6/2015 | Laifenfeld et al. | | |

FOREIGN PATENT DOCUMENTS

| | | | | |
|---|---|---|---|---|
| GB | 2549539 A | * | 10/2017 | ......... B60C 23/0489 |
| JP | 2013103519 A | | 5/2013 | |
| WO | WO-03019461 A1 | * | 3/2003 | ......... G06K 19/0672 |

OTHER PUBLICATIONS

International Search Report and Written Opinion for International Application No. PCT/FR2018/051195, dated Sep. 11, 2018—8 pages.

* cited by examiner

PRIOR ART

METHOD FOR IDENTIFYING AT LEAST ONE TRANSMITTER FOR MONITORING THE PRESSURE OF A TIRE OF A MOTOR VEHICLE BY ASSOCIATION WITH ONE OF THE WHEELS OF SAID MOTOR VEHICLE

CROSS REFERENCE TO RELATED APPLICATIONS

This application is the U.S. National Phase Application of PCT International Application No. PCT/FR2018/051195, filed May 17, 2018, which claims priority to French Patent Application No. 1754548, filed May 23, 2017, the contents of such applications being incorporated by reference herein.

FIELD OF THE INVENTION

The technical field of the invention is tire pressure monitoring systems, and more particularly the association of the emitters of tire pressure monitoring systems with the wheels of the vehicle.

BACKGROUND OF THE INVENTION

In the prior art, tire pressure monitoring systems (TPMS) comprise a TPMS receiver connected to the electronic control unit of the vehicle, and at least one TPMS emitter placed on a wheel of the vehicle. In general, each wheel of the vehicle is equipped with one TPMS emitter.

A TPMS emitter comprises a radiofrequency transmitter (operating at a frequency of 315 MHz or of 433.92 MHz depending on the country), a low-frequency receiver (operating at 125 kHz), a microcontroller, sensors and a battery.

The sensors generally comprise a pressure sensor, a temperature sensor, and an accelerometer.

The pressure sensor and the temperature sensor respectively allow the pressure and temperature of the air contained between the tire and the wheel rim to be measured.

The accelerometer allows the radial acceleration experienced by the wheel, and therefore the movement of the vehicle, to be determined. It also allows each TPMS emitter to be identified and associated with one of the wheels of the vehicle. Specifically, TPMS emitters are interchangeable. The emission thereof intended for the receiver comprises a unique identifier allowing them to be individually identified. However, this unique identifier does not contain their location on the vehicle (front right, front left, rear right, rear left).

To identify the position thereof, the signal output from the accelerometer may be compared with each signal obtained from an accelerometer located in the anti-lock braking system (ABS). It has been demonstrated in the literature the comparing a signal output from a TPSM-emitter accelerometer with the signals coming from the ABS of each wheel leads to a unique concordance with one of the ABS signals. Since the position of each ABS is known by construction and cabling, it is thus possible to know in which wheel the TPMS emitter that is the subject of the identification is installed.

However, the accelerometer is an expensive component, of consequential size and having a high power consumption.

SUMMARY OF THE INVENTION

There is therefore a need for a method for identifying at least one TPMS emitter by association with one of the wheels of the vehicle using the signals of TPMS emitters that are more compact, less expensive and of lower consumption than existing emitters, comprising no accelerometer.

The subject of an aspect of the invention is a method for identifying at least one emitter for monitoring the pressure of a tire of a motor vehicle by association with one of the wheels of said motor vehicle. The motor vehicle is moreover equipped with an anti-lock braking system and with a receiver for monitoring the pressure of at least one tire, which is connected to an electronic control unit of the vehicle and able to communicate with the at least one emitter for monitoring the pressure.

The method comprises the following steps: for each emitter for monitoring the pressure of a tire to be associated with one of the wheels of the vehicle, an intermediate-frequency signal is reconstructed from the radiofrequency signal and from a reference signal, the intermediate-frequency signal being able to be demodulated by a computing means with a view to extracting data carried by the radiofrequency signal, the fast Fourier transform of the intermediate-frequency signal is determined, it is determined whether there is a frequency deviation of the intermediate-frequency signal by comparing the instantaneous value of the fast Fourier transform to the average value of the fast Fourier transform, if such is the case, it is determined whether the absolute value of the amplitude of the deviation is higher than a threshold, periodic and positive, the side of the vehicle on which the emitter for monitoring the pressure of a tire is placed is determined depending on the sign of the deviation, a signal is acquired from the anti-lock braking system for at least one of the wheels on the side on which it was determined that the emitter for monitoring the pressure of a tire is placed, the position of the emitter for monitoring the pressure of a tire is determined depending on the deviation and on the at least one signal from the anti-lock braking system.

To determine whether there is a frequency deviation depending on the instantaneous value of the fast Fourier transform and the average value of the fast Fourier transform, the following steps may be carried out:

the instantaneous value of the fast Fourier transform is subtracted from the average value of the fast Fourier transform, then it is determined whether the obtained signal is nonzero, and if such is the case, it is determined that a frequency deviation is present.

It may be determined that the emitter for monitoring the pressure of a tire is placed on the same wheel as the wheel associated with an ABS if the deviation associated with the emitter and the signal derived from the ABS signal correspond at the end of a first preset number of wheel rotations.

It may be determined that the emitter for monitoring the pressure of a tire is placed on a different wheel from the wheel associated with an ABS if the deviation associated with the emitter and the signal derived from the ABS signal do not correspond at the end of a second preset number of wheel rotations.

It may be determined that an error exists when it is determined that at least two different emitters for monitoring the pressure of a tire are placed in the same location.

When an error exists, the positions stored in memory either of all of the emitters for monitoring the pressure of a tire of the vehicle, or of only the emitters for monitoring the pressure of a tire that are in positional conflict may be deleted, then the method is restarted at the step of acquiring the intermediate-frequency signal for the emitters the position of which has been deleted.

BRIEF DESCRIPTION OF THE DRAWINGS

Other features and advantages of aspects of the invention will become apparent on reading the following description, given solely by way of nonlimiting example, and with reference to the appended drawings, in which.

DETAILED DESCRIPTION OF THE PREFERRED EMBODIMENTS

Figure 1:
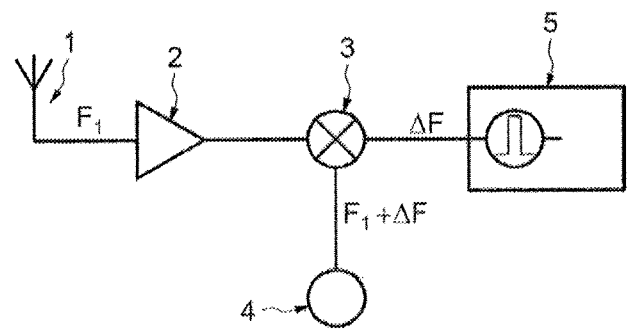
FIG. 1 illustrates a radiofrequency reception system of a TPMS receiver according to the prior art.

FIG. 1 illustrates a radiofrequency reception system of a TPMS receiver according to the prior art.

It may be seen that it comprises a reception antenna 1 connected to a parametric amplifier 2, which itself is connected to a mixer 3.

The mixer 3 is connected via another input to a phased-locked loop (PLL) referenced 4 and via its output to the intermediate filter 5 of a computing means.

The reception antenna 1 receives the radiofrequency signal and converts it into an electrical signal at a frequency F1, which signal is amplified by the parametric amplifier 2. The amplified signal is mixed with a frequency shift F1+ΔF received from the phase-locked loop 4 so as to generate a shifted signal at the frequency ΔF.

The shifted signal is processed by the intermediate filter 5, which reconstructs a time-dependent power signal that may then be processed in order to extract the data carried by the radiofrequency signal.

Figure 2:
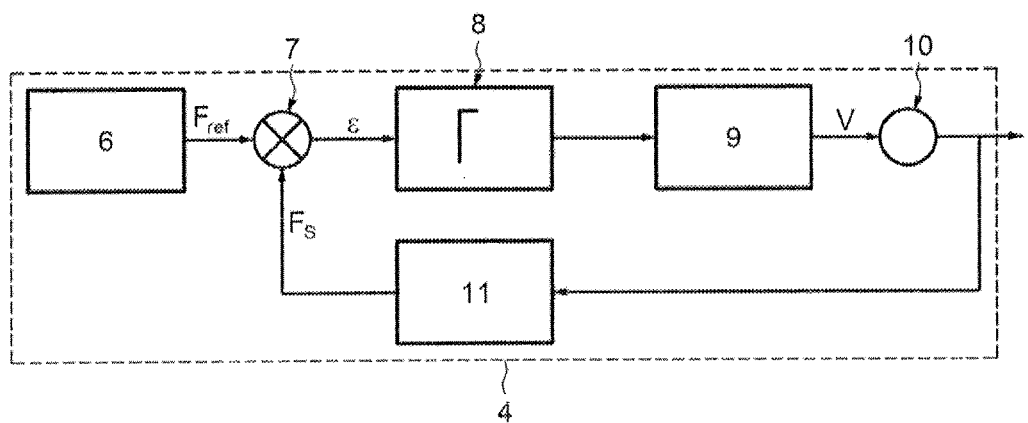
FIG. 2 illustrates a phase-locked loop according to the prior art.

FIG. 2 illustrates a phase-locked loop 4 according to the prior art.

It comprises a means 6 for generating a reference frequency, which means is connected to the input of a phase comparator 7. The means for generating a reference frequency may be a quartz oscillator or a MEMS oscillator (MEMS being the acronym of MicroElectroMechanical System).

The output of the phase comparator 7 is connected to a low-pass filter 8, the output of which is connected to a charge pump 9. A voltage-controlled oscillator (VCO) referenced 10 is connected via its input to the charge pump 9 and via its output to the output of the phase-locked loop 4 and to a frequency divider 11, the frequency divider 11 being connected to an input of the comparator 7.

The means 6 for generating a reference frequency emits a signal at a reference frequency Fref. The phase comparator 7 determines a discrepancy ε depending on the phase discrepancy between the signal at the reference frequency Fref and the signal at the frequency Fs output from the frequency divider 11.

The error signal bearing the discrepancy ε is then filtered with a low-pass filter 8 so as to remove the negative components therefrom.

The charge pump 9 generates a voltage V depending on the filtered signal, allowing the voltage-controlled oscillator 10 to be controlled so that it emits as output a signal the frequency of which is substantially constant and comprised in a frequency range centered on a multiple of the reference frequency Fref dependent on the division coefficient of the frequency divider 11.

The inventors have observed that the frequency shift of the signal received at the input of the filter 5 comprises a component already present in the received radiofrequency signal in addition to the component ΔF inserted by the phase-locked loop.

After study, they observed that this component varied with the rotation of the TPMS emitter because of the Doppler effect. It will be recalled that the Doppler effect consists in a shift in the frequency of an electromagnetic emission because of the relative movement of a source with respect to a receiver.

The aim of an aspect of the invention is thus to detect the start of movement of the TPMS emitter by determining a component due to the Doppler effect in the signal emitted by the TPMS emitter. It is thus possible to remove the accelerometer from such a TPMS emitter while ensuring the detection of start of movement.

As was seen in the introduction, a TPMS emitter comprises a wireless transmission system for communicating with the TPMS receiver connected to the on-board control unit of the motor vehicle.

Each TPMS emitter is subjected to a circular movement because of its placement in a wheel with respect to the axis of said wheel, whereas the TPMS receiver remains in a fixed position in the vehicle. The circular movement experienced by the TPMS emitter induces a relative movement, making it get closer to the TPMS receiver in one half rotation of the wheel and get further away in the other half rotation.

When the emitter is getting closer to the receiver, the emission frequency experiences a first frequency shift defined by the following equation:

$$\Delta f_1 = f - fe_1 = f \cdot \left(1 - \frac{c}{(c + Vs)}\right) \quad \text{(Eq. 1)}$$

with:
c: the speed of light
Vs: the speed of movement of the emitter with respect to the receiver
f: the frequency of the wave emitted by the emitter.

When the emitter is getting further from the receiver, the emission frequency experiences a second frequency shift defined by the following equation:

$$\Delta f_2 = f - fe_2 = f \cdot \left(1 - \frac{c}{(c + Vs)}\right) \quad \text{(Eq. 2)}$$

Thus, depending on the speed of rotation and the dimensions of the vehicle, the signal emitted by the TPMS emitter experiences a periodic frequency shift.

By determining the presence of a frequency-deviation component that has the signature of a Doppler effect and that is different from the component introduced by the phase-locked loop, it is possible to determine that the TPMS emitter is moving.

To do this, the signal at the input of the intermediate filter 5 is acquired.

Next, a fast Fourier transform (FFT) is carried out on the signal output from the intermediate filter 5.

Figure 3:
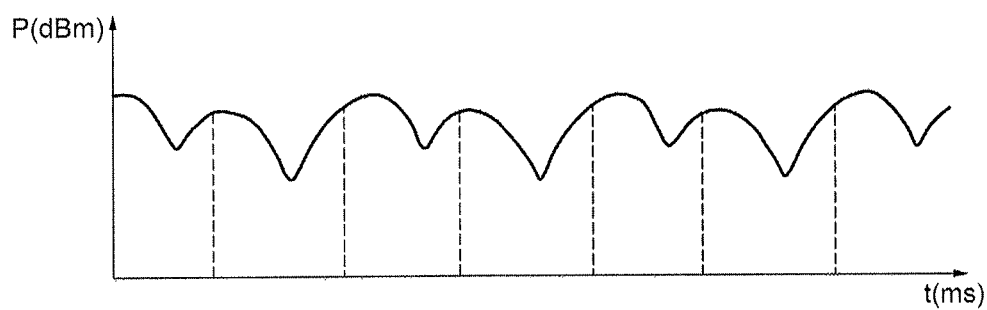
FIG. 3 illustrates the signal output from the intermediate filter of a TPMS receiver.
Figure 4:
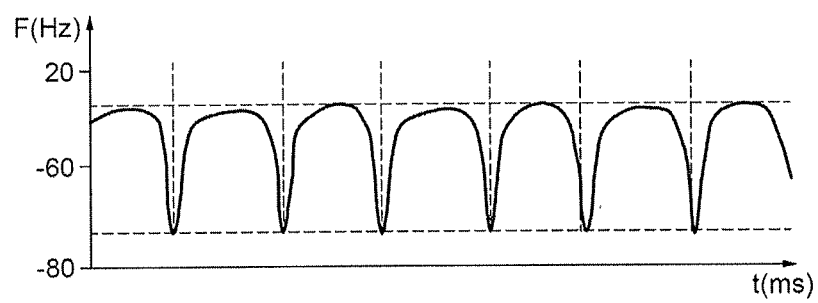
FIG. 4 illustrates the signal obtained as output from the fast Fourier transform of the intermediate-frequency signal for a TPMS emitter on the right side of the vehicle.

By way of illustration, FIG. 3 illustrates the signal output from the intermediate filter 5 and FIG. 4 illustrates the corresponding signal output from the FFT. In the latter signal, the appearance of a periodic signal may be seen.

Figure 5:
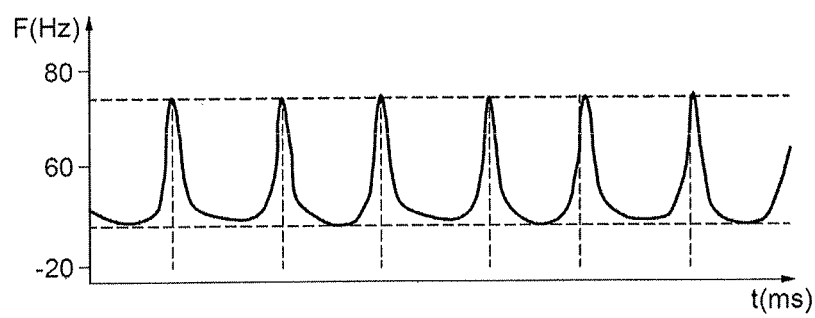
FIG. 5 illustrates the signal obtained as output from the fast Fourier transform of the intermediate-frequency signal for a TPMS emitter on the left side of the vehicle.

Moreover, the inventors have observed that, depending on whether the TPMS emitter is placed on the right or left of the vehicle, the frequency deviation visible in the signal output from the FFT has different signs. By way of assumption, a frequency deviation of positive amplitude is defined to correspond to the left wheel. On account of the opposite directions of rotation of the right and left wheels and of the assumption, a frequency deviation of negative amplitude corresponds to a right wheel. It is obvious that another assumption may be considered without departing from the scope of an aspect of the invention. Thus, the signal illustrated in FIG. 5 is of positive amplitude and corresponds to the left side of the vehicle, whereas the signal illustrated in FIG. 4 is of negative amplitude and corresponds to the right side of the vehicle. It is thus possible to distinguish the position on the left or right of the vehicle depending on the sign of the amplitude of the frequency deviation. Since this deviation is moreover related to the rotation of the TPMS emitter in the wheel, there is a correlation between the frequency-deviation signal and the signal coming from the ABS placed on the same wheel.

In conjunction with the determination of the side of the vehicle on which the TPMS emitter is placed, it is also possible to identify whether the TPMS emitter is placed on the front wheel or on the back wheel. Specifically, once it has been determined on which side (left or right) of the vehicle the TPMS emitter is placed, it remains necessary to associate the TPMS emitter with one of the two (front and back) wheels of said side.

To associate a signal of a TPMS emitter with a wheel, the frequency-deviation signal is compared to the signal received from an ABS placed on the determined side. In the case of a four-wheeled motor vehicle, the comparison of the frequency deviation to the signal of one of the two ABS is considered to be enough to determine the location of the TPMS emitter. Specifically, if the comparison of the frequency-deviation signal with the signal of the front-right ABS shows that there is a concordance of the signals, it is possible to conclude that the TPMS emitter is located in the front-right wheel. In contrast, if the same comparison shows that there is no concordance of the signals, it is possible to conclude that the TPMS emitter is not located in the front-right wheel. The vehicle comprising only one other wheel on the right side, namely the back-right wheel, it is possible to deduce therefrom that the TPMS emitter can only be located in this location.

The comparison of the frequency-deviation signal and of the ABS signal is carried out over one complete wheel rotation. Depending on the desired precision, it may be necessary to consider between two and ten complete wheel rotations in order to confirm the correspondence between the frequency-deviation signal and the ABS signal.

This implies that the frequency-deviation signal and the ABS signal are acquired periodically, for example on each complete wheel rotation.

Figure 6:
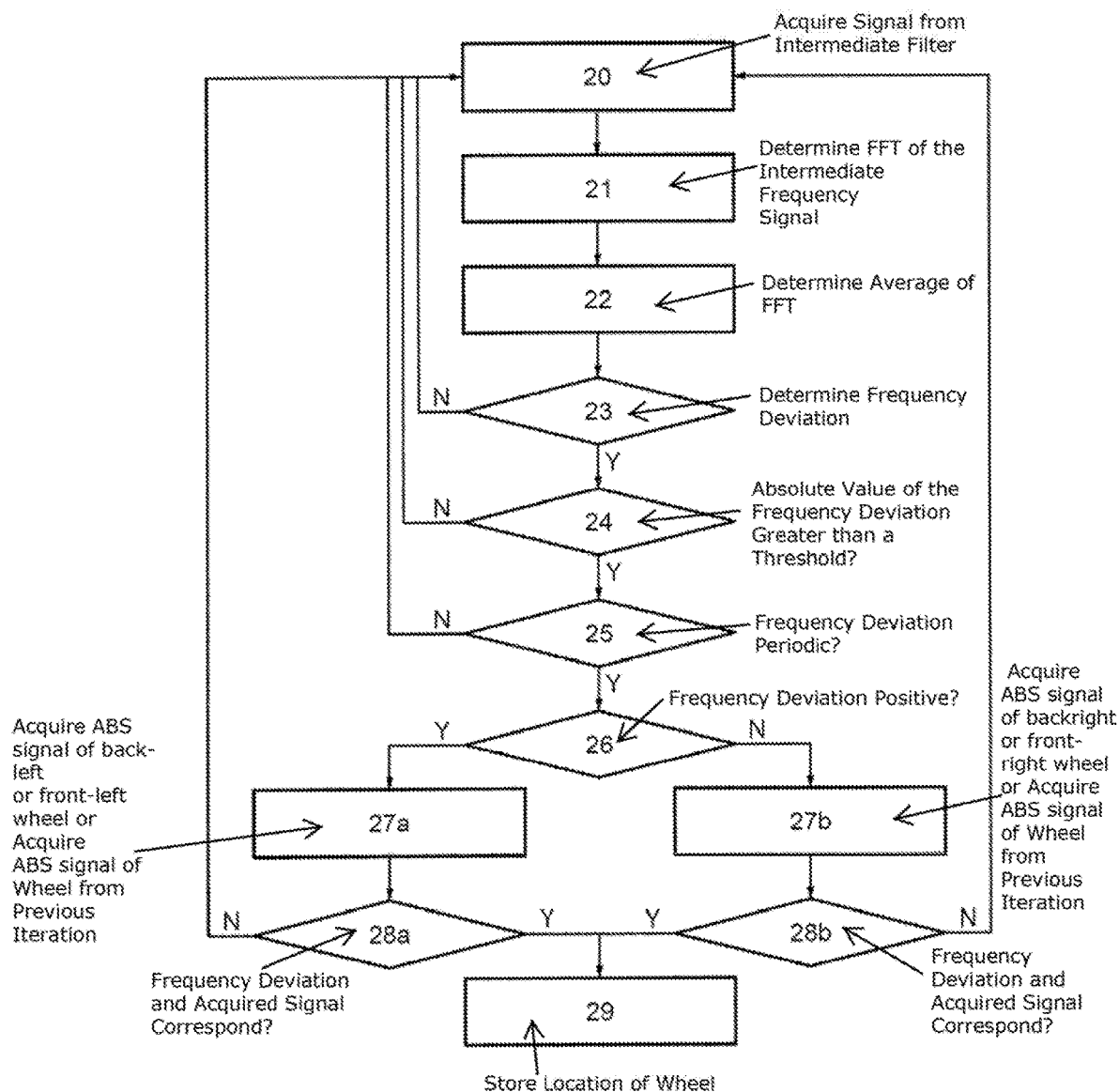
FIG. 6 illustrates the main steps of the method for identifying at least one TPMS emitter by association with one of the wheels of the vehicle.

FIG. 6 illustrates the main steps of the method for identifying at least one TPMS emitter by association with one of the wheels of the vehicle.

The method starts with the initialization of a correlation counter to zero and continues with a first step 20.

In the first step 20, the signal output from the intermediate filter is acquired.

In a second step 21, the fast Fourier transform of the intermediate-frequency signal is determined.

In a third step 22, the average value of the fast Fourier transform of the intermediate-frequency signal is determined over a preset duration. The preset duration is chosen depending on the duration of the data frames received from the TPMS emitter, on the sampling throughput of said frames and on the time that passes between the emission of two successive frames. A person skilled in the art will understand that the detection of the presence of a frequency-deviation component requires a sufficient amount of data. Specifically, the average value of the Fourier transform over the duration corresponding to the reception of the frames bearing the data is representative only for a significant amount of data. Thus, for frames of 10 ms emitted each 100 ms and having a sampling throughput comprised between 9.6 kb/s and 19.2 kb/s, the data contained in at least one frame are considered to allow an average value of the fast Fourier transform that is significant to be obtained.

In a fourth step 23, it is determined whether there is a frequency deviation by comparing the instantaneous value of the fast Fourier transform to the average value of the fast Fourier transform. This may be done by determining whether the subtraction of the signals is nonzero. If such is not the case, the method restarts at the first step 20.

If such is the case, the method continues with a fifth step 24 in which it is determined whether the absolute value of the amplitude of the deviation is higher than a threshold. If such is not the case, the method restarts at the first step 20.

If such is the case, the method continues with a sixth step 25 in which it is determined whether the deviation is periodic. If such is not the case, the method restarts at the first step 20.

If such is the case, the method continues with a seventh step 26 in which it is determined whether the sign of the deviation is positive. If such is the case, the TPMS emitter is considered to be placed on the left side of the vehicle and the method continues with step 27a. If such is not the case, the TPMS emitter is considered to be placed on the right side of the vehicle and the method continues with step 27b. In step 27a, if the correlation counter is zero, a signal of the ABS corresponding to the back-left wheel is acquired or a signal of the ABS corresponding to the front-left wheel is acquired. If such is not the case, a signal of the ABS corresponding to the wheel for which the signal was acquired in the preceding iteration is acquired.

In step 28a, it is determined whether the deviation signal and the acquired signal of the ABS correspond. If such is the case, it is determined that the correlation between the deviation and the ABS signal is proven, that the TPMS emitter is placed on the wheel the TPMS signal of which was taken into account in the comparison with the deviation and the method continues with step 29. If such is not the case, it is determined whether the correlation counter is lower than a preset limit value. If such is the case, the correlation counter is incremented and a new deviation signal is determined by restarting the method at step 20. If the correlation counter is equal to the preset limit value, it is determined that the compared signals do not correspond and that the TPMS emitter is placed on the wheel the TPMS signal of which was not taken into account in the comparison with the deviation. The method then continues with step 29.

The method continues with a step 29 in which the location of the wheel on which the TPMS emitter is installed is stored in memory. Steps 27b and 28b relating to the right side, similar to steps 27a and 28a relating to the left side, will now be described.

In step 27b, if the correlation counter is zero, a signal of the ABS corresponding to the back-right wheel is acquired or a signal of the ABS corresponding to the front-right wheel of the vehicle is acquired. If such is not the case, a signal of the ABS corresponding to the wheel for which the signal was acquired in the preceding iteration is acquired.

In step 28b, it is determined whether the deviation signal and the acquired signal of the ABS correspond. If such is the case, it is determined that the correlation between the deviation and the ABS signal is proven, that the TPMS emitter is placed on the wheel the TPMS signal of which was taken into account in the comparison with the deviation and the method continues with step 29. If such is not the case, it is determined whether the correlation counter is lower than a preset limit value. If such is the case, the correlation counter is incremented and a new deviation signal is determined by restarting the method at step 20. If the correlation counter is equal to the preset limit value, it is determined that the compared signals do not correspond and that the TPMS emitter is placed on the wheel the TPMS signal of which was not taken into account in the comparison with the deviation. The method then continues with step 29.

The method continues with a step 29 in which the location of the wheel on which the TPMS emitter is installed is stored in memory. Steps 20 to 29 of the method are carried out for each of the other TPMS emitters, simultaneously or successively.

Such an embodiment allows a more rapid determination of the positions of the TPMS emitters at the cost of a lower robustness to errors.

In one embodiment, when it is determined that the correlation between the deviation and the ABS signal is proven in steps 28a and 28b, it is determined whether the correlation counter is lower than a preset limit value. If such is the case, a correlation counter is incremented and a new deviation signal is determined by restarting the method at step 20. If the correlation counter is equal to the preset limit value, it is determined that the compared signals correspond and that the TPMS emitter is placed on the wheel the TPMS signal of which was taken into account in the comparison with the deviation. The method then continues with step 29. Such an embodiment allows the presence of a correlation over a plurality of iterations to be confirmed.

Figure 7:
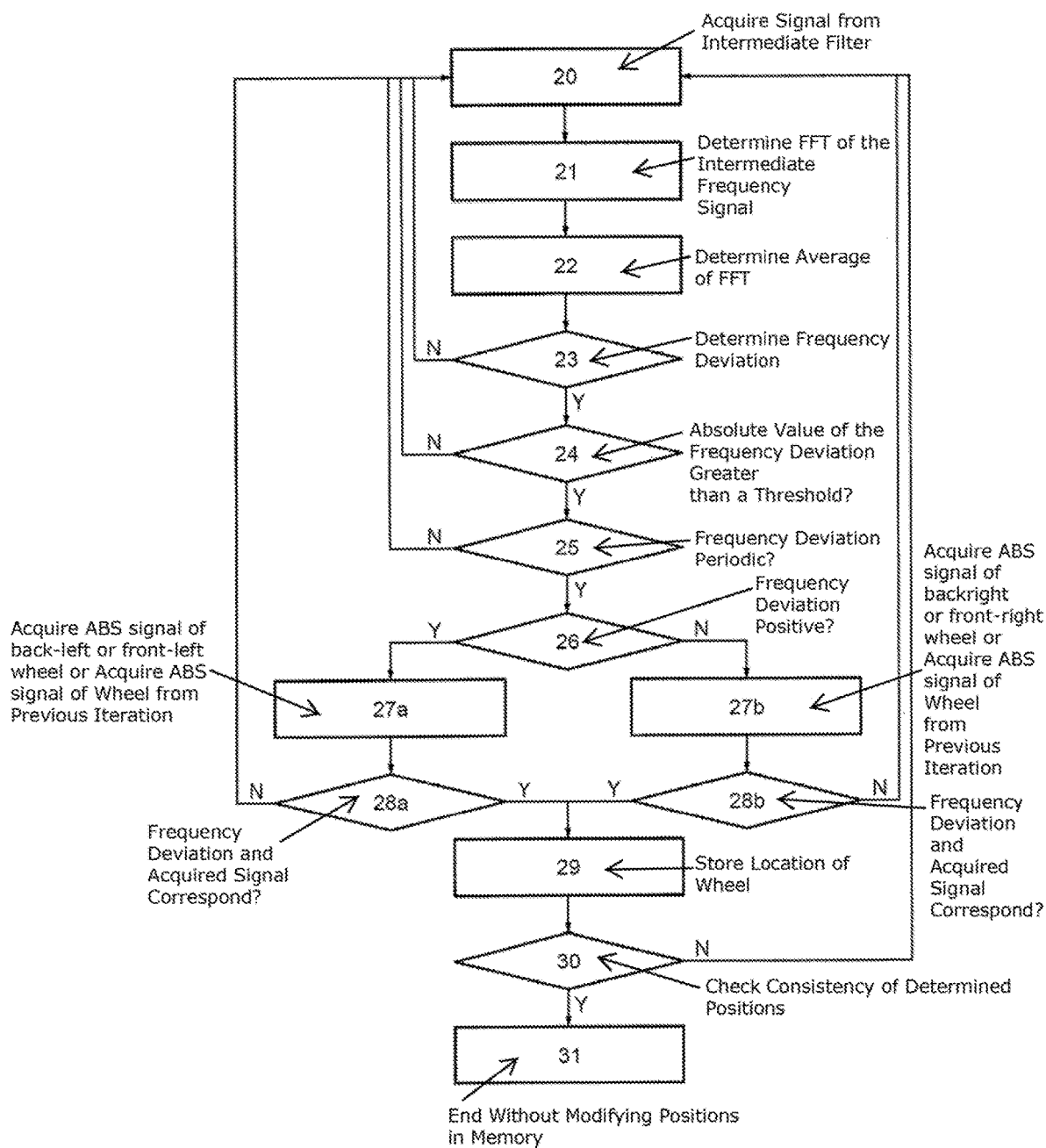
FIG. 7 illustrates the main steps of the method for identifying at least one TPMS emitter by association with one of the wheels of the vehicle according to another embodiment.

In another embodiment illustrated in FIG. 7, the deviation corresponding to each TPMS emitter is compared to each ABS signal corresponding to the side identified by the sign of the deviation.

The position of each TPMS emitter is recorded at the end of each step 29. The method then continues with a step 30 in which the consistency of the determined positions is checked. Specifically, the positions of the TPMS emitters must always be distinct. It is determined that an error exists when it is determined that at least two different TPMS emitters are placed in the same location. It is then possible to delete the positions stored in memory either of all of the TPMS emitters of the vehicle, or of only the TPMS emitters that are in positional conflict. The method then repeats steps 20 to 29 for each of the TPMS emitters the positions of which have been deleted. Alternatively, it is possible to emit an error signal indicating a fault in the identification of the TPMS emitters. If all the positions are different, the method ends with step 31 without modifying the positions stored in memory of the TPMS emitters.

Such an embodiment makes it possible to ensure a higher robustness at the cost of a potentially slower convergence of the identification.

The embodiments described above were described in the context of a four-wheeled motor vehicle, with two wheels to the right and two wheels to the left.

However, a person skilled in the art will be able to understand without difficulty that an aspect of the present invention may be applied to a vehicle comprising a different number of wheels.

The invention claimed is:

1. A method for identifying at least one emitter for monitoring a pressure of a tire of a motor vehicle by association with one of wheels of said motor vehicle, the motor vehicle moreover being equipped with an anti-lock braking system (ABS) and with a receiver for monitoring the pressure of at least one tire, the receiver is connected to an electronic control unit of the motor vehicle and able to communicate with the at least one emitter for monitoring the pressure, the method comprising:
    for each emitter, of the at least one emitter, for monitoring the pressure of a tire to be associated with one of the wheels of the motor vehicle:
        reconstructing an intermediate-frequency signal from a radiofrequency signal received from the emitter and from a reference signal, the intermediate-frequency signal being able to be demodulated by a processor with a view to extracting data carried by the radiofrequency signal,
        determining an average value of a fast Fourier transform of the intermediate-frequency signal, and an instantaneous value of the fast Fourier transform of the intermediate-frequency signal,
        determining whether there is a frequency deviation of the intermediate-frequency signal by comparing the instantaneous value of the fast Fourier transform to the average value of the fast Fourier transform,
        when the frequency deviation is determined, determining whether an amplitude of the frequency deviation is higher than a threshold, and determining if the amplitude of the frequency deviation is periodic,
        when the amplitude of the frequency deviation is higher than the threshold and the amplitude of the frequency deviation is periodic, determining a side of the motor vehicle on which the emitter for monitoring the pressure of the tire is placed depending on whether the frequency deviation is a positive deviation or a negative deviation,
        acquiring a signal from the ABS for at least one of the wheels on the side on which it was determined that the emitter for monitoring the pressure of the tire is placed,
        determining a correlation value between the frequency deviation and the signal from the ABS, and
        determining position of the emitter for monitoring the pressure of the tire depending on the correlation value between the frequency deviation and the signal from the ABS.

2. The method as claimed in claim 1, wherein, when determining the frequency deviation, the instantaneous value of the fast Fourier transform is subtracted from the average value of the fast Fourier transform to determine a difference, then it is determined whether the difference is nonzero, and when the difference is nonzero, it is determined that the frequency deviation is present.

3. The method as claimed in claim 2, wherein it is determined that the emitter for monitoring the pressure of the tire is placed on the same wheel as the wheel associated with the ABS when the frequency deviation associated with the emitter and the signal from the ABS correspond at the end of a first preset number of wheel rotations.

4. The method as claimed in claim 2, wherein it is determined that the emitter for monitoring the pressure of the tire is placed on a different wheel from the wheel associated with the ABS when the frequency deviation associated with the emitter and the signal from the ABS do not correspond at the end of a second preset number of wheel rotations.

5. The method as claimed in claim 2, wherein it is determined that an error exists when it is determined that at least two different emitters, of the at least one emitter, for monitoring the pressure of a tire are determined to be in the same position.

6. The method as claimed in claim 1, wherein it is determined that the emitter for monitoring the pressure of the tire is placed on the same wheel as the wheel associated with the ABS when the frequency deviation associated with the emitter and the signal from the ABS correspond at the end of a first preset number of wheel rotations.

7. The method as claimed in claim 6, wherein it is determined that an error exists when it is determined that at least two different emitters, of the at least one emitter, for monitoring the pressure of a tire are determined to be in the same position.

8. The method as claimed in claim 1, wherein it is determined that the emitter for monitoring the pressure of the tire is placed on a different wheel from the wheel associated with the ABS when the frequency deviation associated with the emitter and the signal from the ABS do not correspond at the end of a second preset number of wheel rotations.

9. The method as claimed in claim 1, wherein it is determined that an error exists when it is determined that at least two different emitters, of the at least one emitter, for monitoring the pressure of a tire are determined to be in the same position.

10. The method as claimed in claim 9, wherein, when the error exists, the positions stored in memory either of all of the emitters, of the at least two emitters, for monitoring the pressure of a tire of the motor vehicle, or of only the emitters for monitoring the pressure of a tire that are in positional conflict are deleted, then the method is restarted at the reconstructing of the intermediate-frequency signal for the emitters the position of which has been deleted.

* * * * *